United States Patent [19]

Nagano et al.

[11] Patent Number: 4,506,646
[45] Date of Patent: Mar. 26, 1985

[54] ELECTRONIC CONTROLLED FUEL INJECTION SYSTEM AND INJECTION TIMING CONTROL METHOD THEREFOR

[75] Inventors: Masami Nagano; Takeshi Atago; Tatsuya Yoshida, all of Katsuta, Japan

[73] Assignee: Hitachi, Ltd., Tokyo, Japan

[21] Appl. No.: 396,141

[22] Filed: Jul. 7, 1982

[30] Foreign Application Priority Data

Jul. 8, 1981 [JP] Japan ................................ 56-105537

[51] Int. Cl.³ ...................... F02M 39/00; F02D 17/02
[52] U.S. Cl. ..................................... 123/501; 123/481
[58] Field of Search ............... 123/501, 500, 357, 358, 123/359, 446, 480, 481, 198 R, 198 F

[56] References Cited

U.S. PATENT DOCUMENTS 4,327,688  5/1982  Lowther ............................. 123/501
4,383,515  5/1983  Higashiyama ..................... 123/480
4,411,230 10/1983  Lee ..................................... 123/481

Primary Examiner—Charles J. Myhre
Assistant Examiner—Carl Stuart Miller
Attorney, Agent, or Firm—Antonelli, Terry & Wands

[57] ABSTRACT

An electronic controlled fuel injection system having electromagnetic fuel injection valves each of which injects fuel twice during 4-cycle operation strokes, wherein a reference cylinder is provided to inject fuel at intervals of 360° in crankshaft angle, and the next operating cylinder is made to inject fuel 180° after the fuel injection timing for the reference cylinder.

5 Claims, 8 Drawing Figures

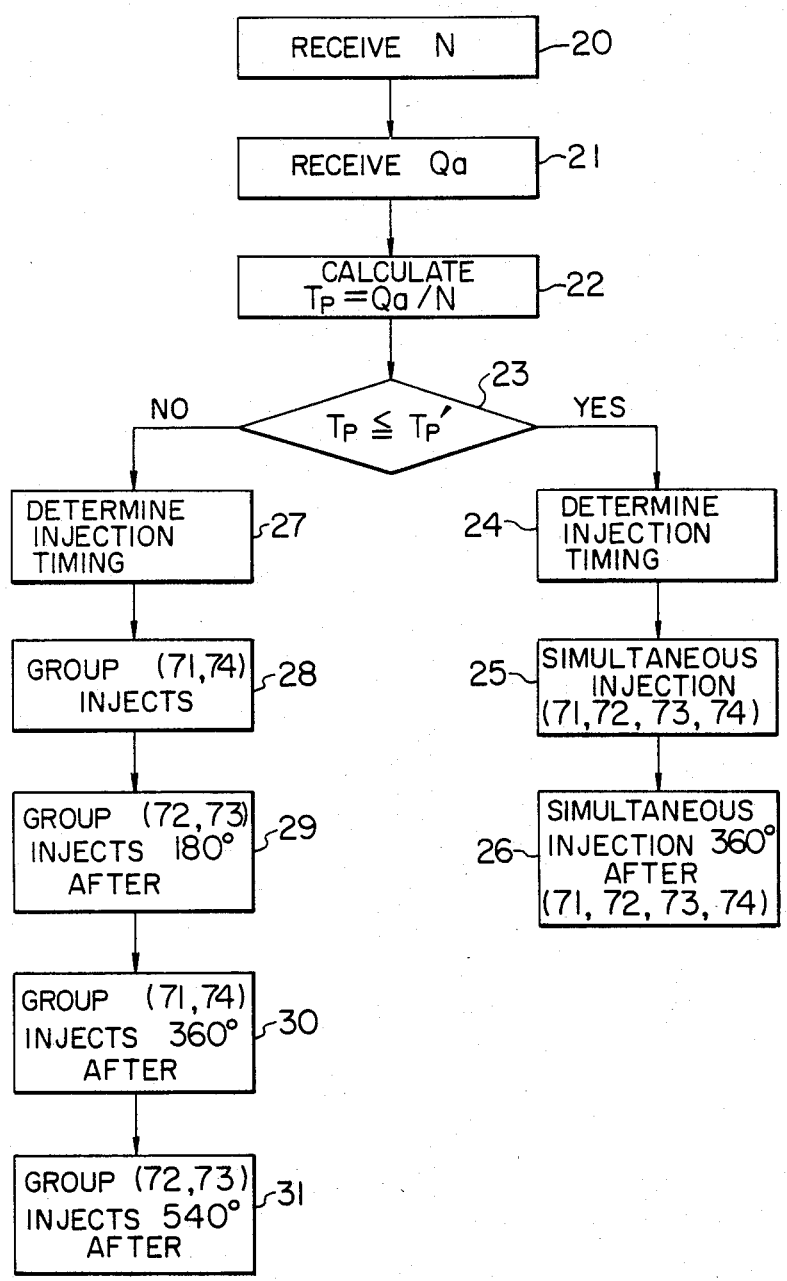

though the pressures downstream of the throttle valves are different between the cylinders as shown in FIG. 4 and there are provided the fuel injection valves which simultaneously inject fuel into the cylinders irrespective of the pressure difference, the same amount of fuel can be injected at the same pressure into each cylinder as shown in FIG. 5, and thus the generation of harmful exhaust

ELECTRONIC CONTROLLED FUEL INJECTION SYSTEM AND INJECTION TIMING CONTROL METHOD THEREFOR

This invention relates to an electronic controlled fuel injection system for use in a 4-cycle operation engine, and having throttle valves disposed in suction paths communicating with a plurality of cylinders, and electromagnetic fuel injection valves provided downstream of the throttle valves and driven by electronic control means for determining amounts of fuel to be injected on the basis of operation parameters of the engine.

Generally in the 4-cycle operation engine incorporated in a motorcycle or the like, a throttle valve is provided in a suction path communicating with each cylinder so as to control the amount of intake air, and an electromagnetic fuel injection valve is provided downstream of the throttle valve so as to control the amount of fuel.

These electromagnetic fuel injection valves simultaneously inject fuel to all cylinders once per revolution of engine crankshaft, and eventually they inject fuel twice during 4-cycle operation strokes.

In this engine incorporated in a motorcycle or the like, however, the pressures downstream of the throttle valves always change in the range from atmospheric pressure to −500 mmHg because of large valve overlap between suction and exhaust valves, and their changes have phase differences between the cylinders. In other words, in 4-cylinder engine, the suction stroke is performed in the first, third, fourth and second cylinders in this order and the pressures downstream of the throttle valves are changed with phases in the order of the throttle valves.

Therefore, when the electromagnetic fuel injection valves simultaneously inject fuel into the respective cylinders, the suction pressures are different in spite of the fact that the injection valves open at the same time, causing the valves to inject different amounts of fuel, which leads to an increase of harmful exhaust gas component and fluctuation of engine rotation. This problem often occurs particularly upon low speed driving.

Accordingly, it is an object of this invention to provide an electronic controlled fuel injection system and the injection timing control method in which substantially the same amount of fuel is injected into each cylinder during 4-cycle operation strokes, suppressing the generation of harmful exhaust gas component and reducing the fluctuation of engine rotation.

The feature of this invention is that in 4-cycle operation engine, the fuel injection for a cylinder operated following a reference cylinder into which fuel is injected at intervals of 360° is performed 180° after the fuel injection timing for the reference cylinder.

The above and other objects, features and advantages will be apparent from the following detailed description taken in connection with the accompanying drawings in which:

FIG. 8 is a flow chart of the operation of the electronic controlled fuel injection system of this invention.

Figure 1:
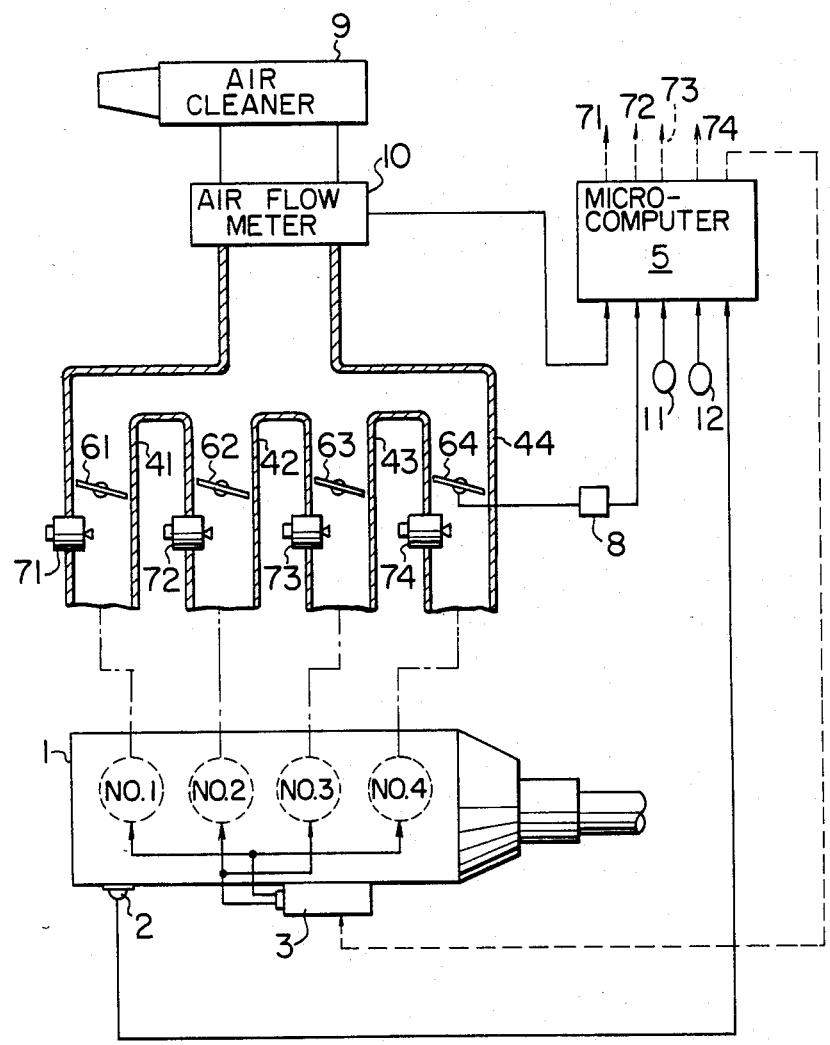
FIG. 1 is an arrangement of an electronic controlled fuel injection system to which this invention is applied.

Referring to FIG. 1, an engine 1 comprises first, second, third and fourth cylinders No. 1, No. 2, No. 3 and No. 4, which perform 4-cycle operations, namely, suction, compression, explosion and exhaust strokes to cause the crankshaft to give two revolutions.

The engine 1 is provided with a cooling water temperature sensor 2, and an ignition coil 3. The sensor 2 detects the temperature of the cooling water to produce an output signal as a parameter for increasing the amount of fuel to be injected and delaying the ignition timing, and supplies the output signal to a microcomputer 5. The ignition coil 3 supplies a high voltage to the ignition plugs (not shown) provided at the cylinders No. 1 to No. 4, and its operation is controlled by the microcomputer 5. Here, the ignition plugs at the first and fourth cylinders No. 1 and No. 4 are supplied simultaneously with such high voltage, and those at the second and third cylinders No. 2 and No. 3 are supplied simultaneously with such high voltage. The cylinders No. 1 to No. 4 of the engine 1 are individually communicated to suction paths 41 to 44, respectively, in which there are provided throttle valves 61 to 64 and electromagnetic fuel injection valves 71 to 74 downstream of the throttle valves 61 to 64, respectively. The throttle valves 61 to 64 are operated in synchronism with each other, and the throttle valve 64 thereof is provided with a throttle valve switch 8, which detects idling and fully open conditions and supplies a signal of the detected conditions to the microcomputer 5. The electromagnetic fuel injection valves 71 to 74 are supplied with fuel at constant pressure from a fuel tank through a fuel pump and a fuel pressure regulator, not shown. The suction paths 41 to 44 are extended upstream to meet one another and communicate with an air cleaner 9 through an air flow meter 10 for detecting the amount of intake air. The air flow meter 10 thus produces parameters for determining valve opening time during which the electromagnetic fuel injection valves 71 to 74 open. To the microcomputer 5 are applied signals from a sensor 11 for detecting the rotational frequency of engine, a crank angle sensor 12 and so on.

Figure 2:
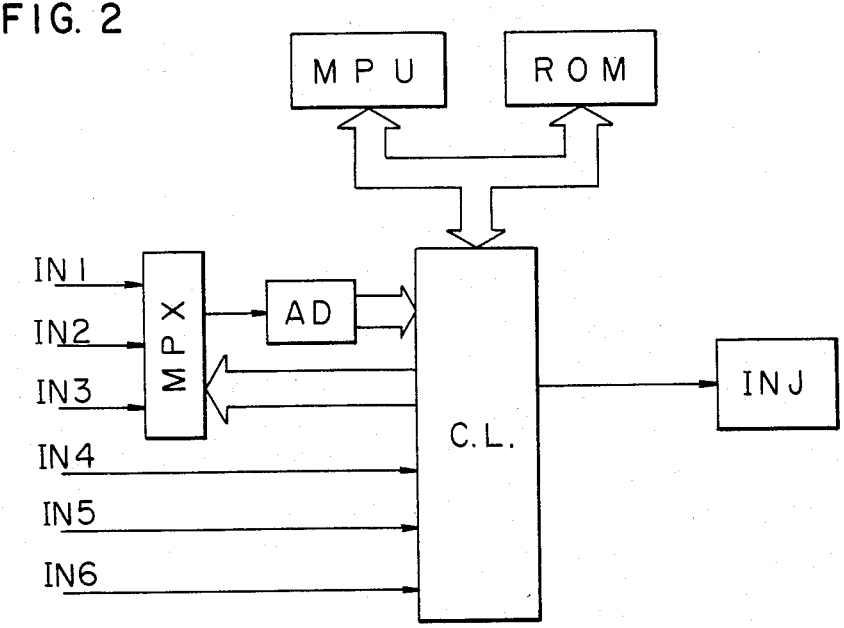
FIG. 2 is an arrangement of a microcomputer.

The microcomputer 5 is arranged as shown in FIG. 2. Digital signals IN4 to IN6 indicative of the rotational frequency of engine and so on are applied directly to a control logic CL, and analog signals IN1 to IN3 indicative of the amount of air flow from the air flow meter 10 and so on are supplied through an A/D converter AD to the control logic CL. A number of analog signals to be supplied will be switched to be selected by use of a multiplexer MPX. The control logic CL transmits and receives data to and from a microcompressor MPU and a memory ROM, so as to calculate and correct the pulse width associated with each input and then it supplies a pulse to the fuel injection valves INJ.

For easy understanding of this invention, a conventional way of fuel injection will be described below.

Figure 3:
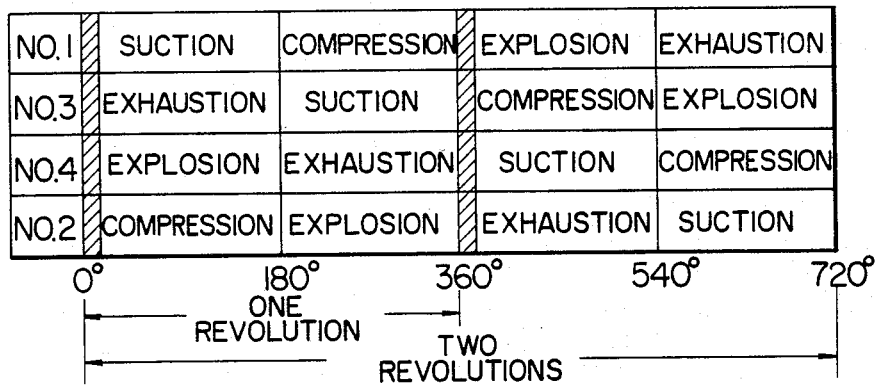
FIG. 3 shows the relationship between the injection timing and operation strokes in the conventional electronic controlled fuel injection system.
Figure 4:
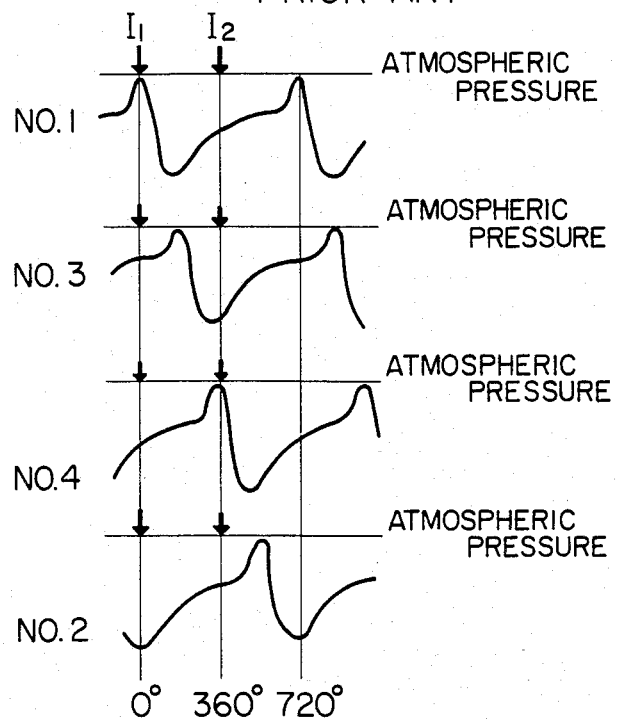
FIG. 4 shows the relationship between the injection timing and the pressure change of each suction path in the electronic controlled fuel injection system of this invention.

FIG. 3 shows each stroke and fuel injection timing with respect to the rotational angle of the crankshaft of the cylinders No. 1 to No. 4. The shaded areas show the timing of fuel injection. As will be seen from FIG. 3, fuel is injected once to all the cylinders at a time each time the crankshaft rotates once and until one full cycle of the four strokes is completed, fuel is injected twice. Thus, the amount of fuel for two injection is necessary for the full cycle of the four strokes. The pressures of gas in the suction paths 41 to 44 at the lowerstream of the throttle valves 61 to 64 are changed by the operations of the cylinders No. 1 to No. 4 as shown in FIG. 4, in which arrows represents timings of fuel injection. From FIG. 4, it will be seen that when fuel is injected at times $I_1$ and $I_2$, the amounts of fuel supplied to the respective cylinders are not the same because the gas pressues at the lowerstream of the valves 61 to 64 are different, so that harmful exhaust gas components are increased, and the engine rotation is fluctuated.

The fuel injection method according to this invention will hereinafter be described with reference to FIG. 5.

Figure 5:
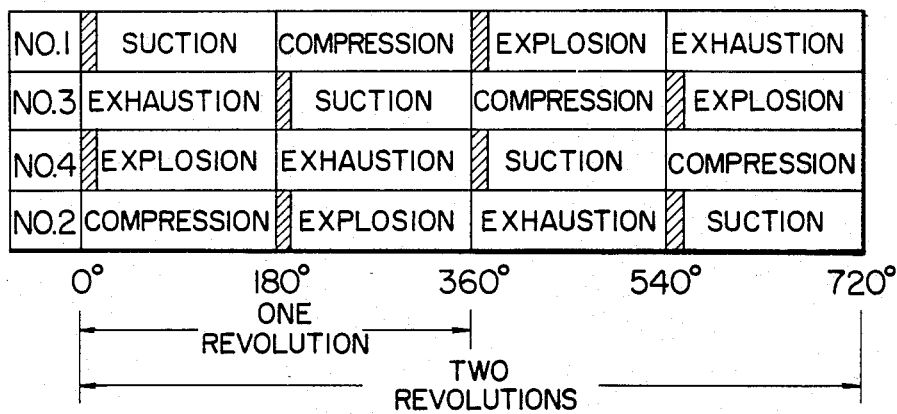
FIG. 5 shows the relationship between the injection timing and the operation strokes in the electronic controlled fuel injection system of the invention.

FIG. 5 shows the operation strokes and fuel injection timing with respect to the rotational angle of crankshaft of cylinders No. 1 to No. 4. From FIG. 5 it will be seen that fuel is simultaneously injected into the first and fourth cylinders No. 1 and No. 4 and, after a delay of 180°, fuel is simultaneously injected into the second and third cylinders No. 2 and No. 4 at a time, thus fuel injection is carried out twice for each complete cycle of operation strokes.

Figure 6:
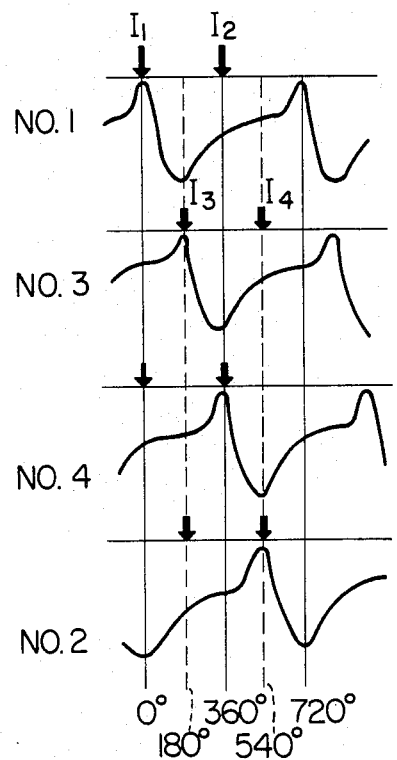
FIG. 6 shows the relationship between the injection timing and the pressure change in each suction path in the electronic controlled fuel injection system according to this invention.

As shown in FIG. 6, at times $I_1$ and $I_2$, fuel is injected into the first and fourth cylinders No. 1 and No. 4, the suction pressure of the first cylinder No. 1 at time $I_1$ approximately equals that of the fourth cylinder No. 4 at time $I_2$, and the suction pressure of the first cylinder No. 1 at time $I_2$ substantially equals that of the fourth cylinder No. 4 at time $I_1$. Therefore, the total amount of fuel necessary to be injected into the first cylinder No. 1 at times $I_1$ and $I_2$ is substantially equal to that of fuel necessary to be injected into the fourth cylinder at times $I_1$ and $I_2$.

On the other hand, at $I_3$ and $I_4$, fuel is injected into the second and third cylinders No. 2 and No. 3 180° later than times $I_1$ and $I_2$ when fuel is injected into the first and fourth cylinders No. 1 and No. 4. The suction pressure in the third cylinder No. 3 at time $I_3$ is substantially equal to that of the second cylinder No. 2 at time $I_4$ and the suction pressure in the third cylinder No. 3 at time $I_4$ is substantially equal to that of the second cylinder No. 2 at time $I_3$. Thus, the total amount of fuel to be injected in the third cylinder No. 3 at times $I_3$ and $I_4$ is substantially equal to that injected in the second cylinder No. 2 at times $I_3$ and $I_4$.

As to the first and third cylinders No. 1 and No. 3, the suction pressure in the frst cylinder No. 1 at time $I_1$ is substantially equal to that in the third cylinder No. 3 at time $I_3$, and the suction pressure in the frst cylinder No. 1 at time $I_2$ is substantially equal to that in third cylinder No. 3 at time $I_4$. Thus, the total amount of fuel to be injected into the first cylinder No. 1 at times $I_1$ and $I_2$ is substantially equal to injected into the third cylinder No. 3 at times $I_3$ and $I_4$.

Consequently, from the above relationship, substantially the same amount of fuel is injected into cylinders No. 1 to No. 4, so that generation of harmful exhaust gas component can be restricted and the fluctuation of engine rotation can be reduced.

Figure 7:
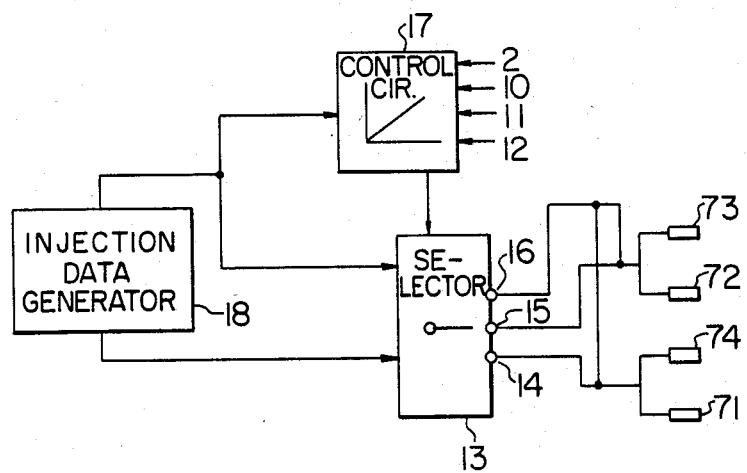
FIG. 7 is a block diagram useful for explaining the basic operation of the electronic controlled fuel injection system of this invention.

As shown in FIG. 7, the group of electromagnetic fuel injection valves 71 and 74 and the group of electromagnetic fuel injection valves 72 and 73 respectively connected to selector terminals 14 and 15 of a selector 13. The group of the valves 71 to 74 is connected to a selector terminal 16 of the selector 13. The selector terminals 14 to 16 are switched by the selector 13, which is preferably formed of a transistor. To the selector 13 is supplied signals for determining the valve opening time during which the valves 71 to 74 open, from a control circuit 17. To the control circuit 17 and selector 13 are supplied a rotational frequency signal and injection timing signal produced by an injection data generator 18.

First, when the selector terminal 14 of the selector 13 is selected by the application of a signal from the injection data generator 18, an injection pulse is supplied to the group of the valves 71 and 74, causing fuel to be injected therefrom. This situation corresponds to the injection at time $I_1$ in FIG. 6. Then, when the crankshaft is rotated 180° from this injection time $I_1$, the selector 13 selects terminal 15, through which an injection pulse is applied to the group of valves 72 and 73, causing fuel to be injected therefrom. This situation corresponds to the injection at time $I_3$ in FIG. 6. Thereafter, when the crankshaft is rotated 180° from the injection time $I_3$, the selector 13 again selects the terminal 14, through which an injection pulse is applied to the valves 71 and 74. This situation corresponds to the injection time $I_2$ in FIG. 6. Then, when the crankshaft is rotated 180° from the injection time $I_2$, the selector 13 again selects the terminal 15, through which an injection pulse is applied to the valves 72 and 73. This situation corresponds to the injection time $I_4$ in FIG. 6. Thus, the above operations supply fuel necessary for the operation strokes of each cylinder No. 1 to No. 4.

When the groups of valves 71, 74 and 72, 73 alternately inject fuel upon high-speed driving, it sometimes takes too much time to supply fuel to the valves. In this case, it is necessary to detect the increase of the amount of intake air and select the terminal 16, through which an injection signal is supplied to all the valves 71 to 74, causing fuel to be simultaneously injected therefrom, as in the conventional way of injection.

As shown in FIG. 8, at step 20, the detected rotational frequency N of the engine is supplied to the microcomputer 5 from the rotational frequency sensor 11. Then, at step 21, the detected amount of intake air Qa is supplied to the computer 5 from the air flow meter 10. At the next step 22, the valve opening pulse duration Tp is determined from Qa/N in the computer 5. Thus, the necessary amount of fuel to be injected is determined. Then, at step 23, decision is made of whether or not the valve opening pulse duration Tp is larger than or equal to a predetermined pulse width Tp'. If the Tp is larger than or equal to Tp', a decision is made that the engine is being driven at a high-speed, and at step 24 the injection timing is determined, which is the time $I_1$ in FIG. 4. At the next step 25, fuel is simultaneously injected from the electromagnetic fuel injection valves 71 to 74 and, at step 26, at time $I_2$ 360° in crankshaft angles after time $I_1$, fuel is again simultaneously injected from the valves 71 to 74.

On the other hand, if at step 23 Tp is smaller than Tp', decision is made that the engine is being driven at a low-speed, and at step 27 the injection timing is determined, which is time $I_1$ in FIG. 6. Then, at step 28, the group of valves 71 and 74 simultaneously inject fuel. At the next step 29, at time $I_3$, 180° in crankshaft angle after $I_1$, the group of valves 72 and 73 simultaneously injects fuel. Then, at step 30, at time $I_2$, 360° after $I_1$, the group of valves 71 and 74 simultaneously injects fuel and at the next step 31, at time $I_4$ 540° after $I_1$, the group of valves 72 and 74 simultaneously inject fuel. In this embodiment, since fuel is injected when each cylinder piston is in the vicinity of top dead center, as shown in FIG. 5, a uniform amount of fuel is supplied to each cylinder. In other words, since the slope of pressure change is not so large in the vicinity of the top dead center of piston, the amount of fuel is not so changed even if the injection timing is shifted slightly. On the contrary, outside the top dead center, the pressure change has a large slope, and therefore the amount of fuel is liable to change if the injection timing is slightly shifted.

As described above, in accordance with this invention, since the amount of fuel to be injected during the strokes of each cylinder is substantially not affected by the pressure at each suction path, a uniform amount of fuel to be injected is supplied to each cylinder, and consequently harmful exhaust gas component generation can be suppressed and the variation of engine rotation can be reduced.

We claim:

1. An electronic-controlled fuel injection system comprising:
   suction paths respectively communicating with four cylinders of an engine for four-cycle operation;
   throttle valves disposed in said suction paths;
   electronic control means for determining an amount of fuel to be injected into the respective cylinder on the basis of an amount of intake air drawn the engine; and
   electromagnetic fuel injection valves disposed downstream of said throttle valves and controlled by said electronic control means;
   wherein said electronic control means includes injection timing control means for controlling the fuel injection timing so that fuel is simultaneously injected at a first predetermined injection timing at each 360° in crankshaft angles of said engine into a reference cylinder and another cylinder having an operation cycle delayed by 360° from the reference cylinder and so that fuel is simultaneously injected at a second predetermined injection timing delayed at 180° from said first predetermined injection timing at each 360° into two cylinders whose respective operation cycles are delayed by 180° and 540° from that of said reference cylinder.

2. An electronic controlled fuel injection system according to claim 1, wherein the operation of said fuel injection timing control means is stopped when a predetermined amount of intake air is drawn into the engine.

3. An electronic controlled fuel injection system according to claim 1, wherein said fuel injection timing for said reference cylinder is determined when the piston of said reference cylinder is in the vicinity of the top dead center.

4. In an electronic controlled fuel injection system having suction paths respectively communicating with four cylinders of an engine for four-cycle operations, throttle valves disposed in said suction paths, and electromagnetic fuel injection valves disposed downstream of said throttle valves and driven by electronic control means for determining an amount of fuel to be injected into the respective cylinders on the basis of an amount of intake air drawn into the engine, a fuel injection timing control method comprising the steps of:
   (a) detecting a rotational frequency of said engine and an amount of intake air to be drawn into the engine;
   (b) determining a valve opening time for each of said electromagnetic fuel injection valves on the basis of said rotational frequency and the amount of intake air drawn into the engine;
   (c) determining, at each 360° in crankshaft angles of the engine, the injection timing for an electromagnetic fuel injection valve for injecting fuel to a single reference cylinder of said four cylinders and a cylinder whose operation cycle is delayed by 360° in crankshaft angles of the engine from that of said reference cylinder; and
   (d) determining, at each 360° with a delay of 180° from the injection timing of said reference cylinder, the injection timing for the electromagnetic fuel injection valves for simultaneously injecting fuel into two cylinders whose operation cycles are delayed by 180° and 540° from that of said reference cylinder.

5. In an electronic controlled fuel injection system having suction paths respectively communicating with a plurality of cylinders for four-cycle operations, throttle valves disposed in said suction paths, and electromagnetic fuel injection valves disposed at the lower-stream of said throttle valves and driven by electronic control means for determining an amount of fuel to be injected on the basis of an amount of air sucked into the engine, a fuel injection timing control method comprising steps of:
   (a) detecting a rotational frequency N of said engine and an amount of air Qa to be sucked thereinto;
   (b) determining a valve opening time for each of said electromagnetic fuel injection valves on the basis of said rotational frequency N and amount Qa of air to be sucked;
   (c) determining the injection timing for the electromagnetic fuel injection valve for supplying fuel to the other cylinders simultaneously with the electromagnetic fuel injection valve for supplying fuel to said reference cylinder when the valve opening time for the electromagnetic fuel injection valve for supplying fuel to the reference cylinder is longer than a predetermined valve opening time;
   (d) determining the injection timing for an electromagnetic fuel injection valve for supplying fuel to a single reference cylinder of said plurality of cylinders, to be each each 360° in crankshaft angle of engine; and
   (e) determining the injection for the electromagnetic fuel injection valves for supplying fuel to the cylinders operative following said reference cylinder, to be 180° after the injection timing for the electromagnetic fuel injection valve supplying fuel to said reference cylinder.

* * * * *